(12) United States Patent
Johnson et al.

(10) Patent No.: US 11,642,861 B1
(45) Date of Patent: *May 9, 2023

(54) SYSTEM AND METHOD FOR SEQUENTIAL CIRCUMFERENTIAL DEPOSITION OF THERMOPLASTIC COMPOSITE PREPREG MATERIAL TO SUCCESSFULLY LAYER PLIES OF PREPREG TAPE, ALLOWING THE CONTINUOUS PROCESSING OF TUBULAR SHAPES AND RODS

(71) Applicants: Ebert Composites Corporation, Chula Vista, CA (US); Gordon Development LLC, Englewood, CO (US)

(72) Inventors: David W. Johnson, San Diego, CA (US); D. Michael Gordon, Englewood, CO (US)

(73) Assignees: Ebert Composites, Inc., Chula Vista, CA (US); Gordon Development LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,724

(22) Filed: Jul. 12, 2022

Related U.S. Application Data (63) Continuation of application No. 16/930,137, filed on Jul. 15, 2020, now Pat. No. 11,400,665.

(Continued)

(51) Int. Cl.
*B29C 70/52* (2006.01)
*B29C 70/30* (2006.01)
(Continued)

(52) U.S. Cl.
CPC ............ *B29C 70/526* (2013.01); *B29C 70/30* (2013.01); *B29C 70/528* (2013.01); *B29K 2105/0881* (2013.01); *B29L 2023/22* (2013.01)

(58) Field of Classification Search
CPC ..... B29C 70/526; B29C 70/52; B29C 70/528; B29C 48/0015; B29C 48/0016
See application file for complete search history.

(56) References Cited

U.S. PATENT DOCUMENTS 2,756,458 A    7/1956   Crupp
2,816,595 A *  12/1957  Hudak .................. B29C 70/52
                                                273/DIG. 7

(Continued)

OTHER PUBLICATIONS

Bechtold, G., S. Wiedmer, and K. Friedrich, Pultrusion of Thermoplastic Composites—New Developments and Modelling Studies, Journal of Thermoplastic Composite Materials, vol. 15 (Sep. 2002), pp. 443-465. (Year: 2002).

*Primary Examiner* — Matthew J Daniels
(74) *Attorney, Agent, or Firm* — Procopio Cory Hargreaves and Savitch LLP (57) ABSTRACT

A system for sequential circumferential deposition of thermoplastic composite prepreg material to layer plies of prepreg tape, allowing the continuous processing of tubular shapes and rods, comprising a floating mandrel; a first heatable folding shoe configured to heat and wrap a first prepreg tape onto the floating mandrel; a first forming tube configured to heat and pultrude the first prepreg tape so as to form a first layer ply of prepreg tape on the floating mandrel; a second heatable folding shoe configured to heat and wrap a second prepreg tape onto the first layer ply of prepreg tape on the floating mandrel; a second forming tube configured to heat and pultrude the second prepreg tape so as to form a second layer ply of prepreg tape over the first layer ply of prepreg tape on the floating mandrel.

22 Claims, 6 Drawing Sheets

Related U.S. Application Data (60) Provisional application No. 62/878,201, filed on Jul. 24, 2019.

(51) Int. Cl.
*B29K 105/08* (2006.01)
*B29L 23/00* (2006.01)

(56) References Cited

U.S. PATENT DOCUMENTS

| | | | | |
|---|---|---|---|---|
| 3,185,383 | A | | 5/1965 | Krause |
| 3,185,577 | A | | 5/1965 | Krause |
| 3,199,421 | A | | 8/1965 | Krause |
| 3,729,503 | A | | 4/1973 | Gribou et al. |
| 3,769,127 | A | * | 10/1973 | Goldsworthy ......... B65H 81/08 156/203 |
| 4,820,366 | A | * | 4/1989 | Beever ................... B29C 70/52 156/441 |
| 4,992,229 | A | * | 2/1991 | Beever ................. B29C 70/526 156/199 |
| 4,999,903 | A | * | 3/1991 | Bujes ...................... F16L 9/147 29/DIG. 48 |
| 5,092,950 | A | * | 3/1992 | Spoo .................... B29C 70/528 425/114 |
| 5,407,616 | A | | 4/1995 | Dube |
| 9,174,393 | B2 | | 11/2015 | Bartel |
| 2011/0048624 | A1 | * | 3/2011 | Nitsch ................. B29C 70/465 156/228 |

\* cited by examiner

SYSTEM AND METHOD FOR SEQUENTIAL CIRCUMFERENTIAL DEPOSITION OF THERMOPLASTIC COMPOSITE PREPREG MATERIAL TO SUCCESSFULLY LAYER PLIES OF PREPREG TAPE, ALLOWING THE CONTINUOUS PROCESSING OF TUBULAR SHAPES AND RODS

CROSS-REFERENCE TO RELATED APPLICATIONS

This application is a continuation of U.S. patent application Ser. No. 16/930,137, filed Jul. 15, 2020, which claims the benefit of U.S. Provisional Application Ser. No. 62/878,201, filed on Jul. 24, 2019, which are incorporated by reference herein.

FIELD OF THE INVENTION

The present invention relates to systems, methods, and machinery for pultruding small diameter composite tubes.

SUMMARY OF THE INVENTION

An aspect of the invention involves a system for sequential circumferential deposition of thermoplastic composite prepreg material to layer plies of prepreg tape, allowing the continuous processing of tubular shapes, comprising a floating mandrel; a first heatable folding shoe configured to heat and wrap a first prepreg tape onto the floating mandrel; a first forming tube configured to heat and pultrude the first prepreg tape so as to form a first layer ply of prepreg tape on the floating mandrel; a second heatable folding shoe configured to heat and wrap a second prepreg tape onto the first layer ply of prepreg tape on the floating mandrel; a second forming tube configured to heat and pultrude the second prepreg tape so as to form a second layer ply of prepreg tape over the first layer ply of prepreg tape on the floating mandrel.

One or more implementations of the above aspect of the invention includes one or more of the following: the floating mandrel is stationary; the first heatable folding shoe is at a forming temperature of the first prepreg tape; the first forming tube is at a forming temperature of the first prepreg tape; the second heatable folding shoe is at a forming temperature of the second prepreg tape; the second forming tube is at a forming temperature of the second prepreg tape; a second-to-last tube configured to give additional consolidation pressure to a prepreg stack-up of layer plies of prepreg tape on the floating mandrel; the second-to-last tube is at a higher temperature than the second forming tube; the second forming tube has an inner diameter and the second-to-last tube has an inner diameter that is smaller than the inner diameter of the second forming tube, giving more consolidation pressure to a prepreg stack-up of layer plies of prepreg tape on the floating mandrel; a last, finishing tube configured to provide a final finish on the prepreg stack-up of layer plies of prepreg tape on the floating mandrel; the last, finishing tube is at a melting temperature of the prepreg stack-up of layer plies of prepreg tape on the floating mandrel; the last, finishing tube includes an exit, and the floating mandrel terminates adjacent to the exit of the last, finishing tube; the last, finishing tube includes an exit, and the floating mandrel terminates just prior to the exit of the last, finishing tube; the last, finishing tube includes an exit, and the floating mandrel terminates just after the exit of the last, finishing tube; the last, finishing tube includes an entrance and an exit, and the last, finishing tube is configured to heat near the entrance and cool near the exit; additional, sequential sets of heatable folding shoes and forming tubes configured to add, heat, and pultrude additional layers of prepreg tape so as to form multiple layer plies of prepreg tape on the floating mandrel; one or more gripping mechanisms that pull and advance a frozen solid tube of the layer plies of prepreg tape to advance materials in the system; the floating mandrel is not stationary, but moves with the frozen solid tube; the floating mandrel is a solid material other than the prepreg tape so that the frozen solid tube has a core material and is not hollow; and/or the floating mandrel is wrapped with plies that are discontinuous, stopping short of a full 360-degree wrapping and forming an indent, and additional discontinuous, narrow plies that form a bulge on an opposite side of the floating mandrel from the indent.

Another aspect of the invention involves a method of using the above aspect of the system for sequential circumferential deposition of thermoplastic composite prepreg material to layer plies of prepreg tape, allowing the continuous processing of tubular shapes, comprising heating and wrapping the first prepreg tape onto the floating mandrel using the first heatable folding shoe; heating and pultruding the first prepreg tape with the first forming tube so as to form a first layer ply of prepreg tape on the floating mandrel; heating and wrapping the second prepreg tape onto the floating mandrel using the second heatable folding shoe; heating and pultruding the second prepreg tape with the second forming tube so as to form the second layer ply of prepreg tape over the first layer ply of prepreg tape on the floating mandrel.

A further aspect of the invention involves a system for sequential circumferential deposition of thermoplastic composite prepreg material to layer plies of prepreg tape, allowing the continuous processing of rods, comprising a floating mandrel; a first heatable folding shoe configured to heat and wrap a first prepreg tape onto the floating mandrel; a first forming tube configured to heat and pultrude the first prepreg tape so as to form a first layer ply of prepreg tape on the floating mandrel; a second heatable folding shoe configured to heat and wrap a second prepreg tape onto the first layer ply of prepreg tape on the floating mandrel; a second forming tube configured to heat and pultrude the second prepreg tape so as to form a second layer ply of prepreg tape over the first layer ply of prepreg tape on the floating mandrel.

One or more implementations of the immediately above aspect of the invention includes one or more of the following: the floating mandrel is stationary and terminates just prior to the second-to-last tube; the first heatable folding shoe is at a forming temperature of the first prepreg tape; the first forming tube is at a forming temperature of the first prepreg tape; the second heatable folding shoe is at a forming temperature of the second prepreg tape; the second forming tube is at a forming temperature of the second prepreg tape; a second-to-last tube configured to give additional consolidation pressure to a prepreg stack-up of layer plies of prepreg tape on the floating mandrel; the second-to-last tube is at a higher temperature than the second forming tube; the second forming tube has an inner diameter and the second-to-last tube has an inner diameter that is smaller than the inner diameter of the second forming tube, giving more consolidation pressure to a prepreg stack-up of layer plies of prepreg tape on the floating mandrel; a last, finishing tube configured to provide a final finish on the prepreg stack-up of layer plies of prepreg tape on the floating mandrel; the last, finishing tube is at a melting temperature of the prepreg stack-up of layer plies of prepreg tape on the floating mandrel; the last, finishing tube includes an exit, and the floating mandrel is not stationary and continues through the exit of the last finishing tube; the last, finishing tube includes an entrance and an exit, and the last, finishing tube is configured to heat near the entrance and cool near the exit; additional, sequential sets of heatable folding shoes and forming tubes configured to add, heat, and pultrude additional layers of prepreg tape so as to form multiple layer plies of prepreg tape on the floating mandrel; the floating mandrel is not stationary, but moves with the frozen solid tube; the floating mandrel is a solid material that is identical to the prepreg tape so that the frozen solid tube is a solid rod of homogeneous frozen prepreg material and is not hollow; and/or one or more gripping mechanisms that pull and advance a frozen solid rod of the layer plies of prepreg tape to advance materials in the system.

A still further aspect of the invention involves a method of using the immediately above aspect of the system for sequential circumferential deposition of thermoplastic composite prepreg material to layer plies of prepreg tape, allowing the continuous processing of rods, comprising heating and wrapping the first prepreg tape onto the floating mandrel using the first heatable folding shoe; heating and pultruding the first prepreg tape with the first forming tube so as to form a first layer ply of prepreg tape on the floating mandrel; heating and wrapping the second prepreg tape onto the floating mandrel using the second heatable folding shoe; heating and pultruding the second prepreg tape with the second forming tube so as to form the second layer ply of prepreg tape over the first layer ply of prepreg tape on the floating mandrel

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

With reference to FIGS. 1-10, an embodiment of process, method, and machinery for sequential circumferential deposition of thermoplastic composite prepreg material to successfully layer plies of prepreg tape, allowing the continuous processing of tubular shapes and rods, will be described.

A need exists to process by pultrusion, composite products, such as small diameter tubes using circular or somewhat circular dies with internal floating mandrels, using thermoplastic resin and fiber available in prepreg tapes. And if an internal floating mandrel is eliminated, the resultant continuous pultrusion would be a solid rod. These said tapes are generally available in flat, unidirectional configuration with all fibers oriented in the 0-degree direction of the prepreg tape, with said definition of unidirectional tapes being well recognized in the composites industry. Of course, a circular wrap of 0-degree prepreg material would give the pultrusion off-axis properties (90 degrees, +−45 degrees as an example.)

The rigidity of the thermoplastic material presents a challenge to the preforming of the unidirectional tape around a small diameter mandrel, coupled with the propensity for the tape to split along the unidirectional direction, when bent, both of which cannot be accomplished without the present invention disclosed herein.

Figure 1:
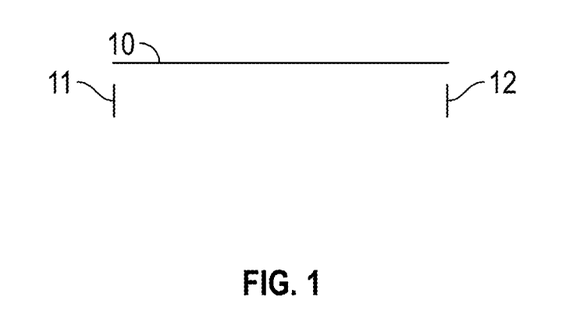
FIG. 1 is a cross sectional view of an embodiment of a narrow prepreg tape.

FIG. 1 is a cross section of an embodiment of a narrow prepreg tape 10 that is approximately 0.006 to 0.0012 inches thick and 1.0 inch wide (the distance between end marks, 11 and 12 in FIG. 1), and provides an example of the problem. In the embodiment of narrow prepreg tape in the following description with respect to FIG. 1, the thickness of the pre-preg tape is 0.0058 inches thick.

Assuming the 1.0 inch wide tape in FIG. 1 was slit from a roll 12 inches wide (the prepreg tape available from Solvay, Tencate, or Barrday, in the US, for example), these 12-inch wide tapes are available from these three manufactures, as an example, and are prepreg tapes with fiber running in a unidirectional direction only, and have no fiber running off-axis to the unidirectional direction. The fibers of the cross section in FIG. 1 are into the paper.

In the embodiment shown, the prepreg material of FIG. 1 is a combined ratio of 65% carbon fiber and 35% PEKK thermoplastic resin (although the fiber and resin could be any of the below list as an example of many thermoplastic resins and many fibers (in any combination)):

| RESIN | FIBER |
| --- | --- |
| PEKK | CARBON |
| PEEK | GLASS |
| PEAK | ARAMID |
| PEK | BORON |
| PPS | SPECTRA |
| PEI | In addition to any structural fibers |
| NYLON 66 | |
| PET PETG PP | |

In addition to any thermoplastic resins

Figure 2:
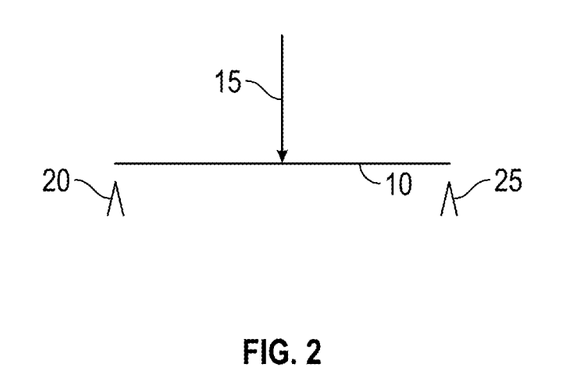
FIG. 2 is a cross sectional view of an embodiment of a narrow prepreg tape simply supported on its edges by supports, and with a load shown applied.

With reference to FIG. 2, in this embodiment, the strip of prepreg 10 is 1.0 inches wide and 30 feet long, the unidirectional carbon material is Hexcel AS4 or AS7 carbon 12k tows into the paper, and the PEKK resin binds a series of 12k tows that are side-by-side. There are several processes for producing this tape, and the emulsion process is one, but all result in tape wherein the thermoplastic PEKK tape, via the melting and pressing of the thermoplastic into the fibers, creates a somewhat solidified tape.

As an example, Tencate produces a tape roll that is 12 inches wide in PEKK/carbon, is nominally 0.0058 inches thick, and fairly rigid. With reference again to FIG. 2, the 1.0 inch wide prepreg tape 10 is simply supported on its edges by supports 20, 25, and a load 15 is applied, which tends to bend the tape 10. Because there is no lateral fiber in this tape 10 (100% of the fiber is into the paper), there exists a maximum deflection in the tape 10 before it catastrophically fails and splits between two adjacent unidirectional fiber elements.

Figure 3:
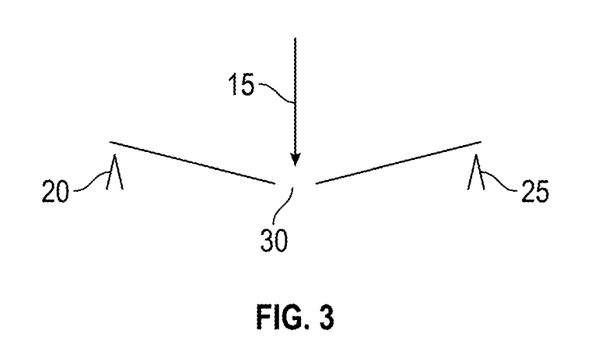
FIG. 3 is a cross sectional view of the narrow prepreg tape, similar to FIG. 2, but shows the effectively thin-walled buckling of the resin between two adjacent fiber elements running in the uni-directional direction into the paper caused by catastrophic excess deflection due to the load being applied between the supports. This can be exacerbated by the prepreg tape being a 0-degree/90-degree tape, where uni-directional fiber runs into the paper and the 90-degree fiber runs parallel to the paper. The prepreg tape can be any combination of 0-degree only, 90-degree only, 0-degree/90-degree, or off-axis 45-degree fiber.

This is effectively thin-walled buckling of the resin between two adjacent fiber elements running in the unidirectional direction into the paper. FIG. 3 demonstrates this failure. The failure point 30 is caused by the catastrophic excess deflection due to load 15 being applied between supports 20 and 25.

Once the breaking of the composite material occurs, one has two additional flat sections, and each of which presents themselves as even more rigid due to their narrow width. In fact, the "rigidity" of the tape material (resistance to bend lateral to the unidirectional direction) goes up by the cube root of the width, i.e., a 0.5 inch wide unidirectional tape will deflect ⅛th the amount of a 1.0 inch wide tape at the same load and so a split tape appears even more rigid for smaller and smaller widths. This is the problem with placing a 1.0 inch wide by 0.0058 inch thick tape, evenly around, for example, a 0.318 inch diameter rod.

0.318 inches in diameter has been selected as an example where the circumference is the same as a 1.0 inch wide prepreg tape (if the tape could be bent successfully around a 0.318 diameter rod) (CIRCUMFERENCE=π×DIAMETER; THEREFORE CIRCUMFERENCE EQUALS 3.1416 (approximately)×0.318 INCHES=1.0 INCHES (approximately)). If a section of Tencate prepreg PEKK/Carbon tape 10, which is 1.0 inches wide, 0.0058 inches thick and 3.0 feet long, is wrapped around a steel rod-tool, or solid internal mandrel 40 that is 3.0 feet long and 0.318 inches in diameter, the ideal wrap of prepreg tape 10 would look like that shown in FIG. 4.

Figure 4:
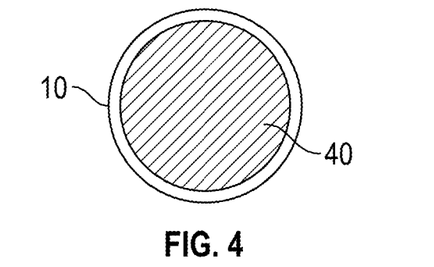
FIG. 4 is a cross-sectional view showing an embodiment of an ideal wrap of prepreg tape around a solid (with or without an internal hole slot for a thermocouple, not shown) internal mandrel.
Figure 5:
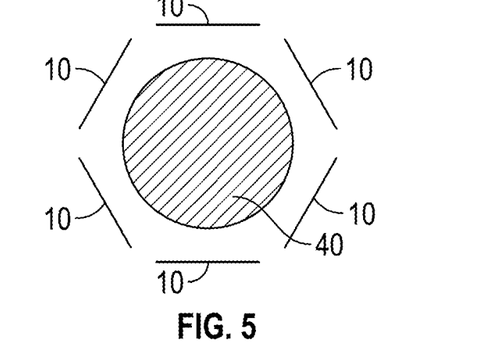
FIG. 5 is a cross-sectional view of exemplary breaks and tape sections that would occur if the prepreg tape of FIG. 1 was attempted to be wrapped around the solid internal mandrel of FIG. 4.

However, in reality, if one were to take the prepreg tape 10 and wrap it around the 0.318 inch rod 40, the cross section of the tape 10 would not look like FIG. 4, but, instead, would more closely resemble the original tape 10 split into seven smaller tape sections 10 around the mandrel 40, as shown in FIG. 5. The tape 10 in FIG. 5 splits several times (as described earlier herein) and the more it splits, the more "rigid" it becomes, preventing a smooth curve around the 0.318 in diameter rod.

If two layers of prepreg tape 10, each 0.0058 inches thick, are placed around the rod 40 of FIG. 5, the problem gets worse as the second tape layer also splits, and as more and more small, rigid tape sections are attempted to build up a uniform wall around the 0.318 inch diameter tool, the problem becomes severely exacerbated. The second layer of segmented tapes may co-mingle with the first layer of segmented tapes, and very quickly, with a floating mandrel, it becomes evident that the wall thickness may most likely vary with it being impossible to keep prepreg tape in the desired location for pultrusion.

All thermoplastic resins have varying characteristics at variable temperatures. They are "frozen" solid below their glass transition temperature, they start to soften above their glass transition temperature and then change viscosity at they are subjected to ever increasing temperatures, until they reach their melt point. The inventors have used this knowledge to assist in the successful pultrusion of a thin-walled tube using PEKK/carbon prepreg material.

Figure 6:
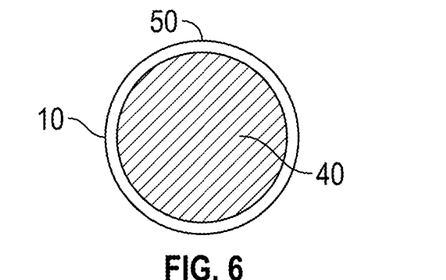
FIG. 6 is a cross-sectional view showing an embodiment of a heated prepreg tape around a solid internal mandrel, and shows a parting line.

The glass transition temperature of PEKK resin is approximately 330 degrees F. Above this there is a gradual softening of the resin. The problem of cracking a 1.0 inch wide prepreg PEKK/Carbon tape is resolved by heating the prepreg tape to, for example, 525 degrees F. Now, with specialized tooling, the tape can be smoothly wrapped around a 0.318 inch mandrel, as illustrated in FIG. 6. It should be noted that the mandrel 40 is shown in FIG. 6 with a smooth prepreg tape 10 wrapped circumferentially and each end of smooth prepreg tape 10 meets at a parting line 50.

Figure 9A:
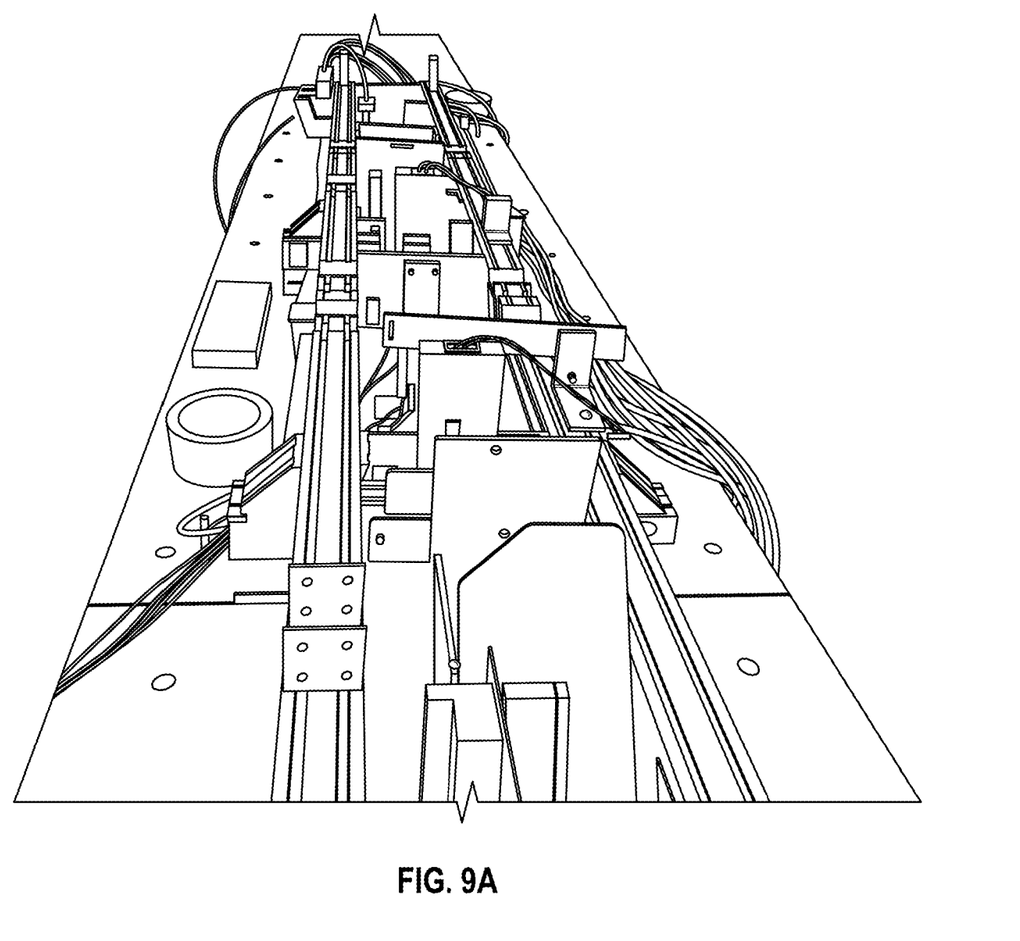
FIG. 9A is a perspective view of an embodiment of support structure for production tooling for the system and method for sequential circumferential deposition of thermoplastic composite prepreg material to successfully layer plies of prepreg tape, allowing the continuous processing of tubular shapes and rods.
Figure 9B:
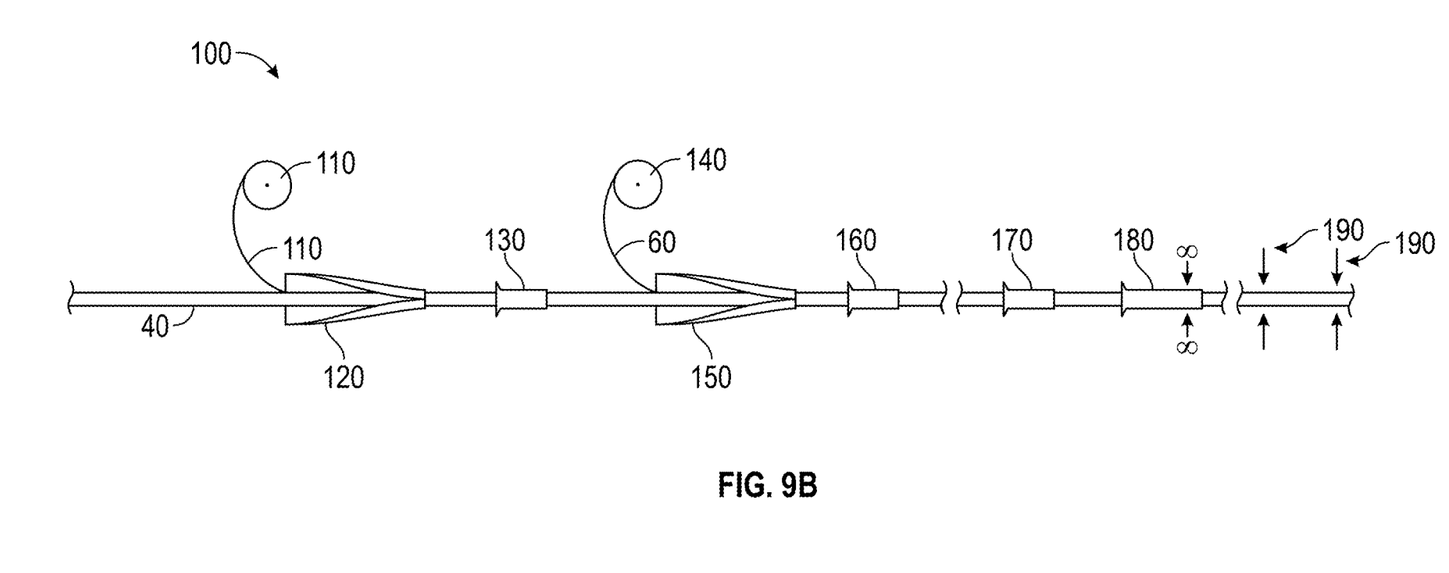
FIG. 9B is a schematic of the system for sequential circumferential deposition of thermoplastic composite prepreg material to successfully layer plies of prepreg tape, allowing the continuous processing of tubular shapes and rods.

With reference to FIG. 9B, a system 100 and method for sequential circumferential deposition of thermoplastic composite prepreg material to successfully layer plies of prepreg tape, allowing the continuous processing of tubular shapes and rods, will be described. The system 100 includes floating mandrel 40, which moves from left to right in the system 100 shown in FIG. 9B, first prepreg tape (or Tape #1) 10 on first prepreg tape spool 110, first heated folding shoe 120, first short forming tube (or first tube) 130, second prepreg tape (or Tape #2) 60 on second prepreg tape spool 140, second heated folding shoe 150, second short forming tube (or second tube) 160, second-to-last tube 170, last/finishing tube 180, and grippers 190.

A first key aspect to the present invention is first heating the prepreg tape 10 to 525 degrees F., approximately, and the folding or wrapping operation that successfully continuously forms a perfect circumferential 1st layer wrap. A second key aspect to the present invention is to do this sequentially. Once a first layer is heated and wrapped on the mandrel, it enters the first short forming tube 130, also at 525 degrees F., approximately. This provides the start of a layer-by-layer build-up of wall thickness.

Directly downstream of the first short forming tube 130, which is sized with an inside diameter that provides good contact with the outside surface of the first layer (referred to herein as "Tape #1") 10, Tape #1 10 exits the first tube 130, rides on the stationary floating mandrel 40, and, after the second prepreg tape 60 is heated and wrapped on the first prepreg tape 10 on the mandrel 40 with the second heated folding shoe 150, the mandrel 40 with Tape #1 10 and Tape #2 60 is fed into the second shot forming tube 160 of slightly greater inside diameter. The second tube 160, along with the second heated folding shoe 150, allows, in the same manner as described for Tape #1 10 to deposit at 525 degrees F., the Tape #2 60 on top of Tape #1 10 and then the combination of Tape #1 10 and Tape #2 60 are formed exiting the second tube 160, also riding on the floating mandrel 40. The exiting of both tapes 10, 60, when tooling is sized correctly would look like FIG. 7A, where 60 is shown as the Tape #2 external to Tape #1, depicted again as 10.

The sequential buildup works well and a sequential stack-up of seven layers (e.g., seven heated folding shoes/steps, seven short forming tubes/steps) has been successfully run. There is no technical reason why that number of layers cannot be increased to 25 layers, 50 layers, 75 layers, or more layers. More layers simply makes a longer pultrusion line necessary. The present invention also is a method for obtaining substantial strength in a tube through wall thickness. Similarly, there is no limit practically to the diameter of the tube, which can also be quite substantial in diameter. Likewise, the tube, although described above as round, in alternative embodiments, could be any shape such as oval, rectangular, custom, or any shape currently pultruded by modern pultrusion manufacturers.

Figure 7A:
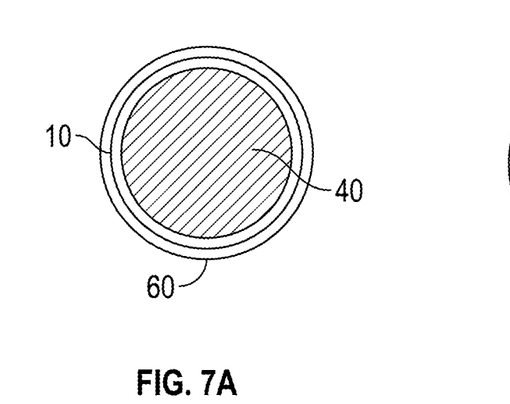
FIG. 7A is a cross-sectional view showing an embodiment of two layers of heated prepreg tape around a solid internal mandrel.
Figure 7B:
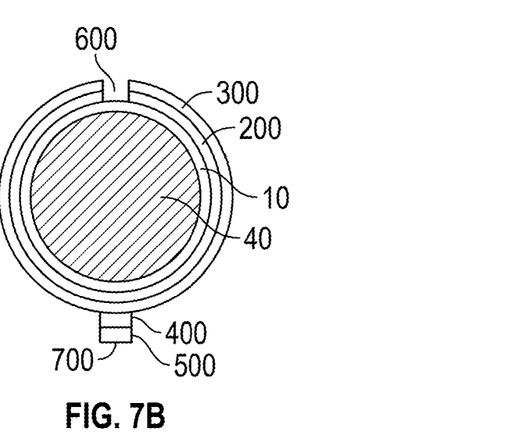
FIG. 7B is a cross-sectional view similar to FIG. 6 showing an embodiment of a mandrel 40 fully wrapped with a first ply 10, a second ply 200, and a third ply 300 but where the plies 200, 300 are discontinuous, stopping short of a full 360-degree wrapping and forming an indent or notch 600 at a top. The indent 600 corresponds with a "male" build-up on the inside of the corresponding die/tubes downstream of the plies 200, 300. A fourth ply 400 and a fifth ply 500 are added. These plies 400, 500 are also discontinuous, narrow, and built-up to form a bulge or key 700 on the opposite side of the pultrusion from the notch 600. The key 700 corresponds to a "female" indent on the inside of the corresponding die/tubes downstream of plies 400, 500.

In the description with respect to FIGS. 6-7B, it should be noted that there is a start-up procedure that allows the material being formed to be pulled downstream by the 2 or more gripping mechanisms 190 that could be of any design but preferably hand-over-hand grippers. These are motion controlled for precise movement.

With reference back to FIG. 7A, in summary, two layers of PEKK/carbon material have been precisely formed around the floating mandrel 40 and exiting tube 160 are two layers at approximately 525 degrees F. The layers are then pulled through the second-to-the-last tube 180 that is smaller in diameter to the 2nd tube 160 and at a higher temperature (not quite the melting temperature of 710 degrees F., but higher than the forming temperatures of 525 degrees F.). This second-to-the-last tube 180 is heated to a temperature of approximately 625-630 degrees F. The second-to-the-last tube 180 in the pultrusion direction is in this example the third tube, and it is slightly smaller than the second tube 160, giving more consolidation pressure to the double prepreg stack-up.

Then, the last tube (the fourth tube in this two-layer-example) 180 is the finishing tube and the floating mandrel 40 with internal temperature measurements terminates at roughly the exit of the last tube. This last tube 180 is at the melt temperature of PEKK resin or approximately 710 degrees F., in the front section. And cooling is provided at the discharge of the tube providing approximately 300 degree F. tube temperature at the exit. Due to thermal expansion and contraction coefficients of PEKK resin, there is a significant contraction of both the outside and inside diameters of the tube in the cooling region (OD and ID) (PEKK can expand up to 1.6% once heated above its glass transition temperature). At the discharge of the ends of the last tube 180, a solid tube 200 that is frozen exits and it is the continuous pulling of this frozen end through pultrusion grippers 190 that allows (after start-up) the continuous pulling of tapes into the pultrusion system 100.

Not shown in figures, but herein disclosed are other features, one or more of which include:

The tapes are formed around the mandrel to arrange the butt joints at opposite sides of the mandrel circumference if, for example, there are only two tapes. If there are four tapes sequentially laid up, the butt joining of the edges of the tape would be arranged at 90 degrees around the mandrel circumference, and so on for multiple tapes (e.g., at 51 degrees for 7 tapes).

IR heating can be added anywhere in the streams to assist with temperature maintenance and to avoid excessive cooling between stations. This will be particularly useful when running higher lines speeds (e.g., 120 inches per minute).

The process is designed for high line speeds, as mentioned above. Because of rapid heating and cooling, it is expected the PEKK resin will have little or no crystallinity, which implies amorphous processing with high ductility, high toughness, and low brittleness (relative to crystalline PEKK resin).

Figure 8:
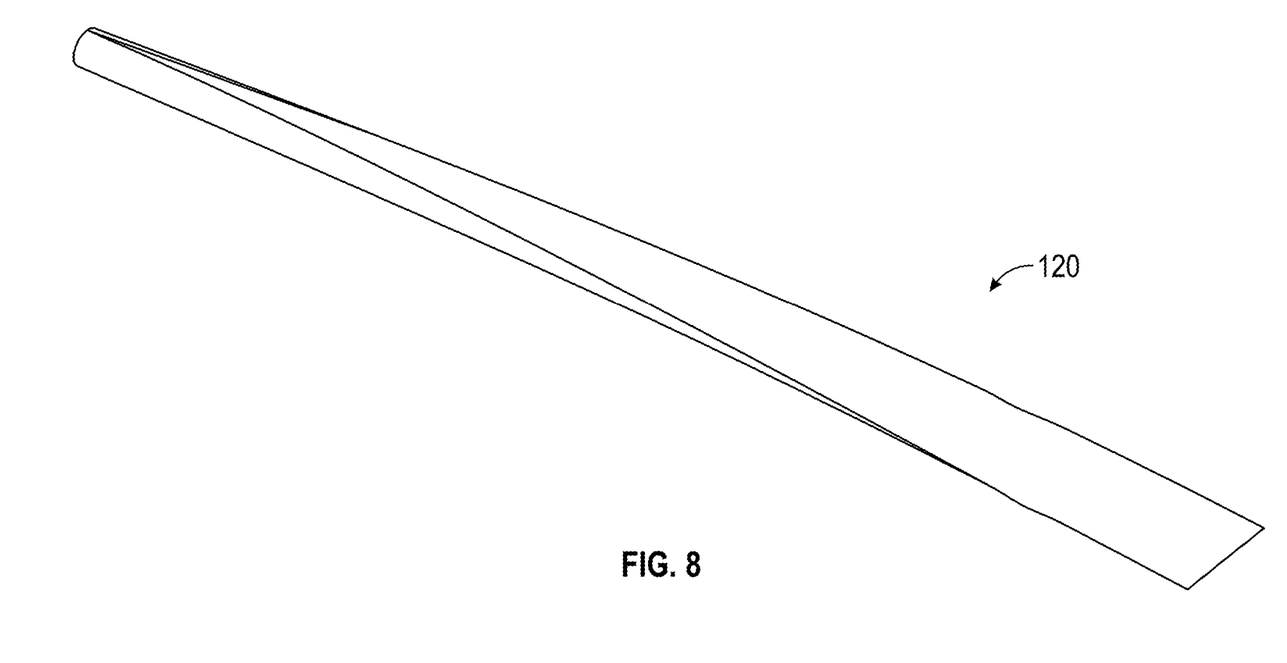
FIG. 8 is a perspective view of an embodiment of a special heated folding shoe that allow the prepreg tape to wrap around the mandrel, transitioning from flat to round.

The tooling is designed to have all streamlines in a tape travel the same distance when transitioning from flat to round; this can be graphically drawn to maintain constant length of tape, whether in the middle of the tape or on the edge of the tape. A special folding shoe (which is heated) allows this "wrap around the mandrel." FIG. 8 shows a CAD drawing of this folding shoe.

The floating mandrel, in a preferred embodiment, can be hollow, to allow multiple process thermocouples to be installed to monitor the temperatures at various locations including the very critical last tube section. Also, a hollow mandrel allows for supplement heat into the prepreg tapes by heating with a cartridge heater installed strategically in the hollow mandrel.

The process, method, and machinery for sequential circumferential deposition of thermoplastic composite prepreg material to successfully layer plies of prepreg tape, allowing the continuous processing of rods incudes keeping a stationary mandrel up to just before the second-to-last-finishing tube. A void created by the termination of the stationary mandrel is made up by squeezing all plies inward, via the two last finishing tubes, so as to make a solid rod. An option includes having the mandrel moved and the mandrel be a stack of prepreg or a solid rod previously pultruded and the layers that get added just continue the stack-up of prepreg material. Another option includes terminating the stationary mandrel just prior to the second-to-the-last-tube and pushing all plies inward via smaller diameters on both the second-to-last-tube and the last tube.

Because the composite shafts and composite components made on this system can have variable tape properties (e.g., variable tensions on individual carbon tows when the prepreg was manufactured), it may be necessary to have a post-processing straightening system available. Because PEKK resin can be heated and then post-stressed, it has been shown that a 30 inch composite tube that is out of straightness, can be heated to 365 degrees F. and then deflected, held in a deflected position until cooled, and the run-out of, for example, +/−0.015 inches can be changed to straight (or at least +/−0.001 inches run-out).

Not mentioned in this disclosure is the type of gripper mechanism, which can be two or more hand over hand grippers that are synchronized, or it could be one or more caterpillar pullers, which are well-known in the industry.

A traveling cut-off saw can be implemented for rapid automatic cutting of the composite tubes, to desired lengths.

Tooling can be quickly changed with production "plug and play" change-out from one set to another to change diameters (ID and OD), wall thickness, number of tapes, and overall set-up, by pinning each set of tooling onto the upstream end of a pultrusion machine, for production purposes.

FIG. 9 shows a picture of an embodiment of the production tooling for the present invention.

Figure 10:
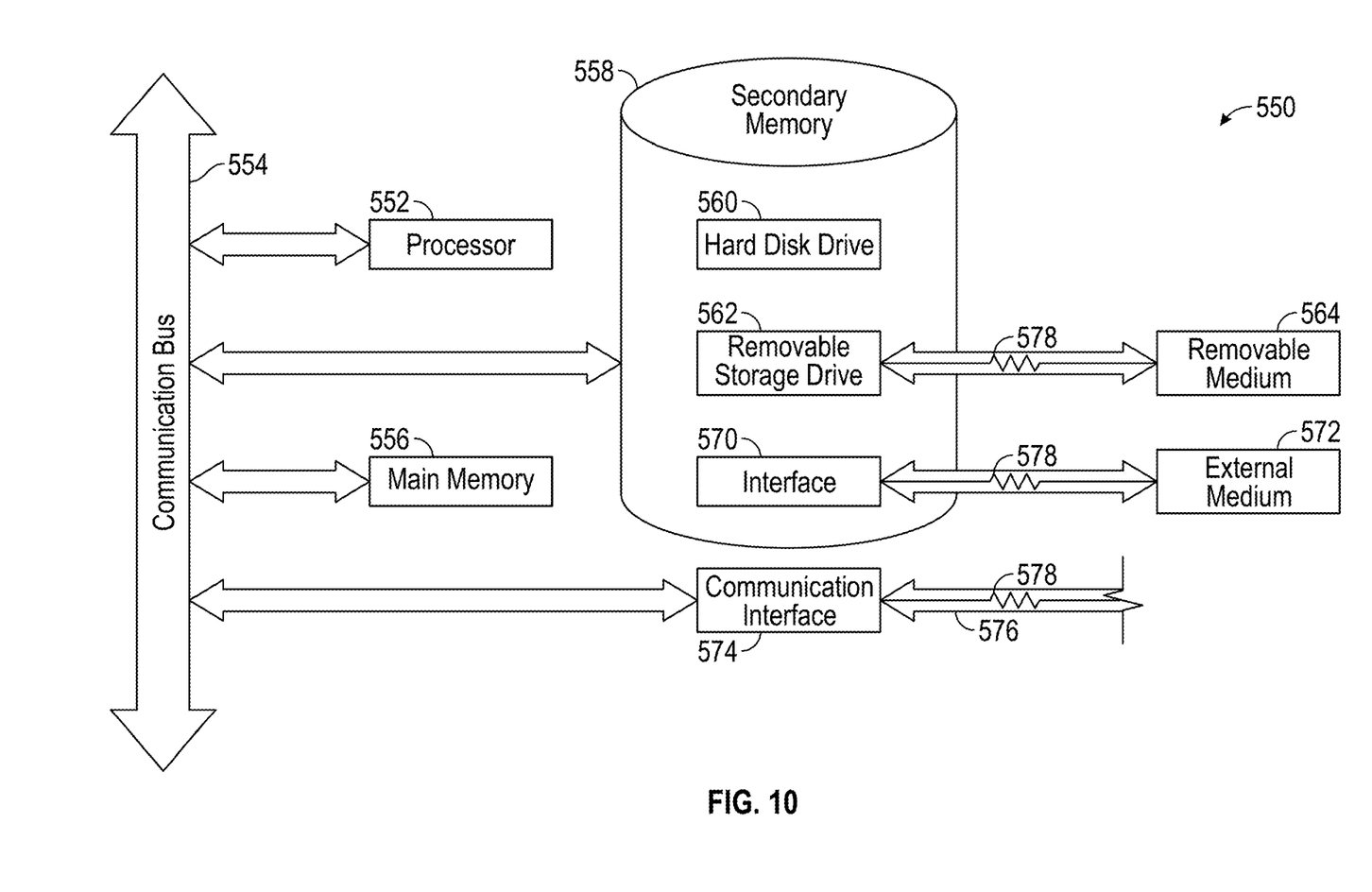
FIG. 10 is a block diagram illustrating an example computer system that may be used in connection with various embodiments described herein.

FIG. 10 is a block diagram illustrating an example computer system 550 that may be used in connection with various embodiments described herein. For example, the computer system 550 may be used in conjunction with computer system(s), computer(s), control(s), controller(s), control system (e.g., software, and/or hardware) for the system for sequential circumferential deposition of thermoplastic composite prepreg material to successfully layer plies of prepreg tape. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSO, asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claim(s), should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A system for sequential circumferential deposition of thermoplastic composite prepreg material to layer plies of prepreg tape, allowing the continuous processing of tubular shapes, comprising:

a floating mandrel;
a first heatable folding shoe configured to heat and wrap a first prepreg tape onto the floating mandrel;
a first forming tube configured to heat and pultrude the first prepreg tape so as to form a first layer ply of prepreg tape on the floating mandrel;
a second heatable folding shoe configured to heat and wrap a second prepreg tape onto the first layer ply of prepreg tape on the floating mandrel;
a second forming tube configured to heat and pultrude the second prepreg tape so as to form a second layer ply of prepreg tape over the first layer ply of prepreg tape on the floating mandrel;
a second-to-last tube configured to give additional consolidation pressure to a prepreg stack-up of layer plies of prepreg tape on the floating mandrel;
wherein the second forming tube has an inner diameter and the second-to-last tube has an inner diameter that is smaller than the inner diameter of the second forming tube, giving more consolidation pressure to a prepreg stack-up of layer plies of prepreg tape on the floating mandrel.

2. The system of claim 1, wherein the floating mandrel is stationary.

3. The system of claim 1, further including additional, sequential sets of heatable folding shoes and forming tubes configured to add, heat, and pultrude additional layers of prepreg tape so as to form multiple layer plies of prepreg tape on the floating mandrel.

4. The system of claim 1, further including one or more gripping mechanisms that pull and advance a frozen solid tube of the layer plies of prepreg tape to advance materials in the system.

5. The system of claim 4, where the floating mandrel is not stationary, but moves with the frozen solid tube.

6. A method of using the system of claim 1 for sequential circumferential deposition of thermoplastic composite prepreg material to layer plies of prepreg tape, allowing the continuous processing of tubular shapes, comprising:
heating and wrapping a first prepreg tape onto the floating mandrel using the first heatable folding shoe;
heating and pultruding the first prepreg tape with the first forming tube so as to form a first layer ply of prepreg tape on the floating mandrel;
heating and wrapping a second prepreg tape onto the floating mandrel using the second heatable folding shoe;
heating and pultruding the second prepreg tape with the second forming tube so as to form the second layer ply of prepreg tape over the first layer ply of prepreg tape on the floating mandrel.

7. The system of claim 1, wherein the floating mandrel is wrapped with plies that are discontinuous, stopping short of a full 360-degree wrapping and forming an indent, and additional discontinuous, narrow plies that form a bulge on an opposite side of the floating mandrel from the indent.

8. The system of claim 1, wherein both the first heatable folding shoe and the second heatable folding shoe include a flat end and opposite round end.

9. A system for sequential circumferential deposition of thermoplastic composite prepreg material to layer plies of prepreg tape, allowing the continuous processing of tubular shapes, comprising:
a floating mandrel;
a first heatable folding shoe configured to heat and wrap a first prepreg tape onto the floating mandrel;
a first forming tube configured to heat and pultrude the first prepreg tape so as to form a first layer ply of prepreg tape on the floating mandrel;
a second heatable folding shoe configured to heat and wrap a second prepreg tape onto the first layer ply of prepreg tape on the floating mandrel;
a second forming tube configured to heat and pultrude the second prepreg tape so as to form a second layer ply of prepreg tape over the first layer ply of prepreg tape on the floating mandrel;
a last, finishing tube configured to provide a final finish on the prepreg stack-up of layer plies of prepreg tape on the floating mandrel,
wherein the last, finishing tube includes an exit, and the floating mandrel terminates adjacent to the exit of the last, finishing tube.

10. The system of claim 9, wherein the floating mandrel terminates just prior to the exit of the last, finishing tube.

11. The system of claim 9, wherein the floating mandrel terminates just after the exit of the last, finishing tube.

12. The system of claim 9, wherein the last, finishing tube includes an entrance, and the last, finishing tube is configured to heat near the entrance and cool near the exit.

13. A system for sequential circumferential deposition of thermoplastic composite prepreg material to layer plies of prepreg tape, allowing the continuous processing of rods, comprising:
a floating mandrel;
a first heatable folding shoe configured to heat and wrap a first prepreg tape onto the floating mandrel;
a first forming tube configured to heat and pultrude the first prepreg tape so as to form a first layer ply of prepreg tape on the floating mandrel;
a second heatable folding shoe configured to heat and wrap a second prepreg tape onto the first layer ply of prepreg tape on the floating mandrel;
a second forming tube configured to heat and pultrude the second prepreg tape so as to form a second layer ply of prepreg tape over the first layer ply of prepreg tape on the floating mandrel;
a second-to-last tube configured to give additional consolidation pressure to a prepreg stack-up of layer plies of prepreg tape to fill the internal void caused by the termination of the stationary mandrel just prior to the second-to-last-tube,
wherein both the first heatable folding shoe and the second heatable folding shoe include a flat end and opposite round end.

14. The system of claim 13, further including a second-to-last tube configured to give additional consolidation pressure to a prepreg stack-up of layer plies of prepreg tape on the floating mandrel, and the floating mandrel is stationary and terminates just prior to the second-to-last tube.

15. The system of claim 13, wherein the second forming tube has an inner diameter and the second-to-last tube has an inner diameter that is smaller than the inner diameter of the second forming tube, giving more consolidation pressure to a prepreg stack-up of layer plies of prepreg tape.

16. The system of claim 13, further including additional, sequential sets of heatable folding shoes and forming tubes configured to add, heat, and pultrude additional layers of prepreg tape so as to form multiple layer plies of prepreg tape on the floating mandrel.

17. The system of claim 16, where the floating mandrel is not stationary, but moves with the frozen solid tube.

18. The system of claim 13, further including one or more gripping mechanisms that pull and advance a frozen solid rod of the layer plies of prepreg tape to advance materials in the system.

19. A method of using the system of claim 13 for sequential circumferential deposition of thermoplastic composite prepreg material to layer plies of prepreg tape, allowing the continuous processing of rods, comprising:
heating and wrapping a first prepreg tape onto the floating mandrel using the first heatable folding shoe;
heating and pultruding the first prepreg tape with the first forming tube so as to form a first layer ply of prepreg tape on the floating mandrel;
heating and wrapping a second prepreg tape onto the floating mandrel using the second heatable folding shoe;
heating and pultruding the second prepreg tape with the second forming tube so as to form the second layer ply of prepreg tape over the first layer ply of prepreg tape on the floating mandrel.

20. A system for sequential circumferential deposition of thermoplastic composite prepreg material to layer plies of prepreg tape, allowing the continuous processing of rods, comprising:
a floating mandrel;
a first heatable folding shoe configured to heat and wrap a first prepreg tape onto the floating mandrel;
a first forming tube configured to heat and pultrude the first prepreg tape so as to form a first layer ply of prepreg tape on the floating mandrel;
a second heatable folding shoe configured to heat and wrap a second prepreg tape onto the first layer ply of prepreg tape on the floating mandrel;
a second forming tube configured to heat and pultrude the second prepreg tape so as to form a second layer ply of prepreg tape over the first layer ply of prepreg tape on the floating mandrel;
a last, finishing tube configured to provide a final finish on the prepreg stack-up of layer plies of prepreg tape to fill the internal void caused by the termination of the stationary mandrel just prior to the second-to-last-tube,
wherein both the first heatable folding shoe and the second heatable folding shoe include a flat end and opposite round end.

21. The system of claim 20, wherein the last, finishing tube includes an exit, and the floating mandrel is not stationary and continues through the exit of the last finishing tube.

22. The system of claim 20, wherein the last, finishing tube includes an entrance and an exit, and the last, finishing tube is configured to heat near the entrance and cool near the exit.

\* \* \* \* \*